US012697845B2

(12) United States Patent
Rimanelli et al.

(10) Patent No.: US 12,697,845 B2
(45) Date of Patent: Aug. 4, 2026

(54) AIRCRAFT INCLUDING A PLURALITY OF NOVEL ELEMENTS AND A METHOD OF ASSEMBLING AND FORMING THE SAME

(71) Applicant: Airspace Experience Technologies, Inc., Detroit, MI (US)

(72) Inventors: Jon Rimanelli, Grosse Pointe Woods, MI (US); Gregory Peterson, Sylvan Lake, MI (US)

(73) Assignee: Airspace Experience Technologies, Inc., Detroit, MI (US)

( * ) Notice: Subject to any disclaimer, the term of this patent is extended or adjusted under 35 U.S.C. 154(b) by 0 days.

(21) Appl. No.: 17/585,735

(22) Filed: Jan. 27, 2022

(65) Prior Publication Data

US 2022/0250739 A1      Aug. 11, 2022

Related U.S. Application Data

(60) Provisional application No. 63/141,941, filed on Jan. 26, 2021.

(51) Int. Cl.
| | |
|---|---|
| B64C 17/02 | (2006.01) |
| B60F 5/02 | (2006.01) |
| B64C 1/16 | (2006.01) |
| B64C 37/00 | (2006.01) |
| B64D 27/31 | (2024.01) |
| B64D 27/34 | (2024.01) |
| B64D 27/357 | (2024.01) |

(52) U.S. Cl.
CPC .................. *B60F 5/02* (2013.01); *B64C 1/16* (2013.01); *B64C 17/02* (2013.01); *B64C 37/00* (2013.01); *B64D 27/31* (2024.01); *B64D 27/34* (2024.01); *B64D 27/357* (2024.01)

(58) Field of Classification Search
CPC . B64C 17/02; B64C 2211/00; B64C 29/0033; B64C 29/075; B64C 29/02; B64C 1/069
See application file for complete search history.

(56) References Cited

U.S. PATENT DOCUMENTS

| | | | | | |
|---|---|---|---|---|---|
| 10,099,783 | B1 * | 10/2018 | Nilson | ................. | B64C 39/024 |
| 10,214,285 | B2 * | 2/2019 | Mccullough | ......... | G05D 1/0011 |
| 10,543,905 | B1 * | 1/2020 | Kwon | ................. | B64D 27/357 |
| 11,465,737 | B1 * | 10/2022 | McDonald | ............. | B64C 27/50 |
| 12,110,105 | B2 * | 10/2024 | McCullough | ............ | B64D 1/08 |

(Continued)

FOREIGN PATENT DOCUMENTS

| | | | | | |
|---|---|---|---|---|---|
| CN | 107042884 | A * | 8/2017 | ............. | B64C 11/32 |
| DE | 102016001771 | A1 * | 1/2017 | ............. | B64C 3/385 |
| KR | 20150085751 | A * | 7/2015 | ........... | B64C 31/024 |

OTHER PUBLICATIONS

Translation of CN 107042884 A (Year: 2017).*

Primary Examiner — Joshua J Michener
Assistant Examiner — Ryan Andrew Yankey
(74) Attorney, Agent, or Firm — Gardella Alciati

(57) ABSTRACT

A modular aircraft includes a plurality of structural elements. The structural elements include a pod module assembly, a wing assembly, and a chassis module. The pod module assembly is configured to be selectively attached to and detached from at least one of the chassis module and the wing module when the aircraft is not in flight. The pod module assembly is configured to transport at least one of a passenger and cargo.

15 Claims, 21 Drawing Sheets

10

(56)                    References Cited

U.S. PATENT DOCUMENTS

| | | | |
|---|---|---|---|
| 2019/0047342 A1* | 2/2019 | Dietrich | B64D 17/80 |
| 2019/0168877 A1* | 6/2019 | Agajanian | B64D 11/00 |
| 2019/0233107 A1* | 8/2019 | Tian | B64C 39/12 |
| 2020/0031478 A1* | 1/2020 | Clark | B64D 15/12 |
| 2021/0107652 A1* | 4/2021 | Velazquez | B64C 29/0033 |
| 2021/0300527 A1* | 9/2021 | Thalheimer | B64C 29/0033 |
| 2021/0362867 A1* | 11/2021 | Tian | B64U 10/13 |
| 2022/0144421 A1* | 5/2022 | Rimanelli | B64D 27/24 |
| 2022/0281597 A1* | 9/2022 | Tian | B64C 39/024 |

* cited by examiner

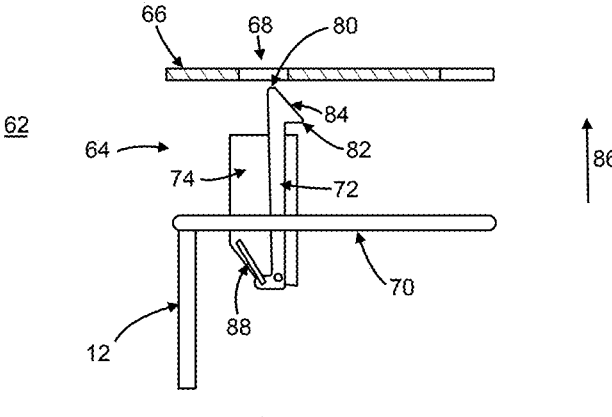
FIG. 11
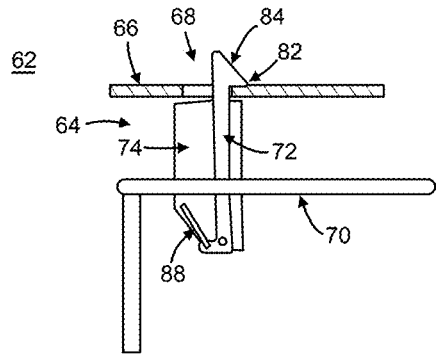
FIG. 12
FIG. 13

10

AIRCRAFT INCLUDING A PLURALITY OF NOVEL ELEMENTS AND A METHOD OF ASSEMBLING AND FORMING THE SAME

CLAIM OF PRIORITY AND CROSS-REFERENCE TO RELATED APPLICATIONS

This application claims the benefit of priority from U.S. Provisional Patent Application No. 63/141,941, filed on Jan. 26, 2021, which is incorporated by reference in its entirety

TECHNICAL FIELD

The present disclosure is related to an aircraft including a plurality of novel elements and a method of assembling and forming the same.

SUMMARY

The present disclosure provides a modular aircraft, including a plurality of structural elements. The structural elements include a pod module assembly, a wing assembly, and a chassis module. The pod module assembly is configured to be selectively attached to and detached from at least one of the chassis module and the wing module when the aircraft is not in flight. The pod module assembly is configured to transport at least one of a passenger and cargo.

The pod module assembly is configured for being transported on the ground or in water by another vehicle, or being self-transportable, when detached from the chassis module and/or the wing module.

The aircraft is configured to operate as at least one of a ground vehicle, a watercraft, and an aerial vehicle.

At least one of the chassis module and the pod module assembly includes an adjustment mechanism configured to vary a center of gravity of the aircraft. The adjustment mechanism is configured to move a weight relative to the chassis module, the pod module assembly, and the wing assembly to vary a center of gravity of the aircraft. The movement of the weight may include moving a power source, i.e., a battery.

A controller is in operative communication with the adjustment mechanism, where the controller is configured to transmit a signal to the adjustment mechanism to move and to vary the center of gravity of the aircraft.

A vehicle including a cargo/passenger module, i.e., a pod module assembly, a wing module, and a chassis module that are joined to create an aerial vehicle, such as an eVTOL, capable of transporting goods and passengers.

The pod module assembly is configured for a wide range of applications including, but not limited to, cargo carrying, passenger carrying, medivac, military usage, firefighting support, and surface and below surface watercraft applications.

The pod module assembly is configured to carry batteries in a floor or subfloor mounting structure, while maintaining cargo capacity to carry cargo and/or passengers during flight and transportation.

The pod module assembly configured with a connector system for connecting and disconnecting with mating hardware on the chassis module, such that widely different module configurations are easily and rapidly changeable.

The cargo module configured to translate longitudinally to assist in adjusting the aircraft center of gravity.

The pod module assembly may be constructed of two or more panels using ferrous or non-ferrous materials capable of being joined.

The pod module assembly is configured to interface with a wheeled or tracked vehicle that is also capable of interfacing with the pod module assembly, such that the module can be lowered and secured to the wheeled or tracked vehicle and raised to meet a chassis mounting interface. The pod module assembly interfaces with a wheeled or tracked vehicle capable of interfacing with the pod module assembly, such that the module can be lowered and secured to the vehicle and raised to meet the chassis mounting interface the vehicle capable of autonomous or piloted ground transport of the cargo/passenger module.

The wing module includes a primary spar, ribs, a leading edge, and a trailing edge with flaps, ailerons, motor spars, structural elements joining the motor spars to the primary wing structure, motors, motor mounting system, thermal management systems for motors, inverters, batteries, wiring, hoses, electrical control modules, a system for interfacing with the chassis and an outer skin.

The structural wing module components may be ferrous or non-ferrous. The preferred embodiment is primarily non-ferrous construction with metal support components, e.g., aluminum brackets. The structural wing module includes a mechanism for rotating the wing through an arc of some magnitude, e.g., 90 degrees. The structural wing module may also include one or more actuators that are configured to fix and control the wing rotational arc. The rotation of the structural wing module may be powered by motor/prop thrust vectoring.

The wing module components include, but are not limited to, spars, spar ribs, leading edges and trailing edges engineered to use manufacturing processes with high run rates, low cost tooling and inexpensive piece costs vs. conventional wing designs. These processes include, but are not limited to, pultrusion, extrusion, 3D printing, automated sheet layup and filament winding;

The wing module is configured to store batteries and/or battery packs internally.

A leading edge of the wing of the wing module is configured to route heated fluid, such that the wing leading edge is de-iced. The fluid is heated using the waste thermal energy created from the heat rejection from sources including, but not limited to, motors, inverters and batteries.

The wing module is affixed with structural elements connecting a multiplicity of motor spars to the wing spar. The wing module is affixed with structural elements connecting a multiplicity of motor spars to the wing spar and utilizing a pylon structure to affix the motor spar to the wing spar. The wing module affixed with structural elements connecting a multiplicity of motor spars to the wing spar and utilizing a pylon structure to affix the motor spar to the wing spar.

The pylon structure being constructed of a wide variety of shapes and materials including but not limited to elliptical, round, square and rectangular geometries and constructed of composite, ferrous or non-ferrous metals, the structure interfacing with the wing spar such that the pylon can be rotated relative to the wing spar in a clockwise or counterclockwise direction about the "Y" axis.

The structure interfacing with the wing spar such that the pylon can be rotated relative to the wing spar in a clockwise or counterclockwise direction about the "Y" axis and joined to the wing spar with an interfacing element such that rotation relative to the wing spar is possible through a range of angles, up to and including 90 degrees;

The wing motor spar elements containing a mechanism for supporting the vehicle including, but not limited to, wheels/tires, suspension, skids and pontoons with or without integrated wheels and tires. The wing motor spar includes a motor, an inverter, a thermal management system, wiring, cooling lines, and the like.

The wing motors acting in concert to provide thrust vectoring to maintain targeted vehicle attitude for takeoff, transition to horizontal flight and landing.

A chassis includes one or more longitudinal elements with variable sections including, but not limited to, square, rectangular, elliptical and oval geometries, a tail section with elements controlling vertical and horizontal airflow, a system for actively controlling vehicle attitude via a rear mounted thruster system, a system for securing a variety of elements including cargo, one or more battery packs, one or more range extenders and appropriate support equipment.

The chassis cargo/passenger module attachment system is translatable longitudinally. The chassis mounted components are translatable longitudinally to assist in adjusting the center of gravity. The chassis geometry easily configurable for a wide variety of lengths and widths without changing tooling. The chassis utilizes a tail module that is easily and rapidly installed on the chassis.

The chassis containing a mechanism for interfacing with the cargo/passenger module such that a cargo/passenger module can be rapidly and easily installed and removed from the chassis structure; this includes mechanical, i.e., quick release shear pins, and magnetic mechanism, e.g., electro-magnetic system with a mechanical back-up.

The chassis module, wing module, and cargo/passenger module is configured to be joined together rapidly and quickly.

The assembled vehicle, i.e., aircraft, can be rapidly disassembled—the target is fifteen minutes—and stored for transport on a variety of large scale vehicles including air, land and water.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

Various features of the present disclosure will become more fully apparent from the following description and appended claims, taken in conjunction with the accompanying drawings. Understanding that these drawings depict only typical embodiments of the invention and are, therefore, not to be considered limiting of its scope, the embodiments of the invention will be described and explained with additional specificity and detail through the use of the accompanying drawings. One or more embodiments will now be described, by way of example, with reference to the accompanying drawings, in which:

FIGS. 11-13 are schematic partial cross-sectional side views illustrating a progression of a latch of the pod module respectively moving from a detached position, to a partially attached position, and a fully attached position with the chassis module.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, down, upper, lower, upward and downward may be used with respect to the drawings. These and similar directional terms are not to be construed to limit the scope of the disclosure in any manner. Additionally, the disclosure, as illustrated and described herein, may be practiced in the absence of any element that is not specifically disclosed herein.

Figure 1:
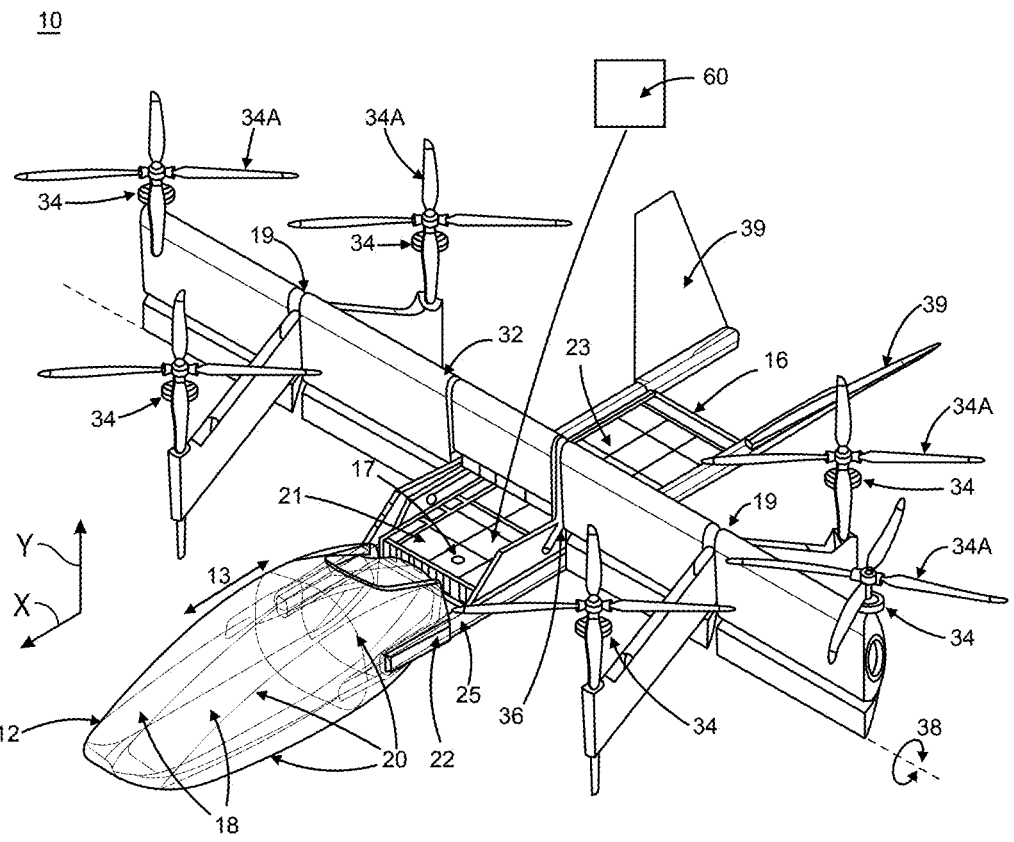
FIG. 1 is a schematic perspective view of an aircraft including a pod module assembly, a wing assembly, and a chassis module, with the wing assembly positioned relative to the pod module assembly and the chassis module in a vertical take-off and landing flight mode.

Referring to the drawings, wherein like reference numerals are used to identify like or identical components in the various views, FIG. 1 shows an aircraft at 10. The aircraft 10 may be an electrically powered vertical takeoff and landing (VTOL) aircraft 10, as shown in FIG. 1. The aircraft 10 may be configured as a thrust vectored electric vertical take-off and landing (eVTOL) aircraft 10. It should be appreciated that the disclosures described herein are not limited to VTOL or eVTOL categories of flight for aircraft, and may also apply to other flight categories, including fixed wing aircraft, rotating wing aircraft, as well as land and water-based vehicles.

The aircraft 10 is configured to include a variety of novel structural elements that provide advantages in construction, assembly, joining, tooling expenses, flight controls, and flight stability. The structural elements of the aircraft include a pod or a cargo/passenger pod module assembly 12 (pod module assembly 12), a wing assembly 14, and a chassis module 16. Details of each of these will be explained in more detail below.

Figure 2:
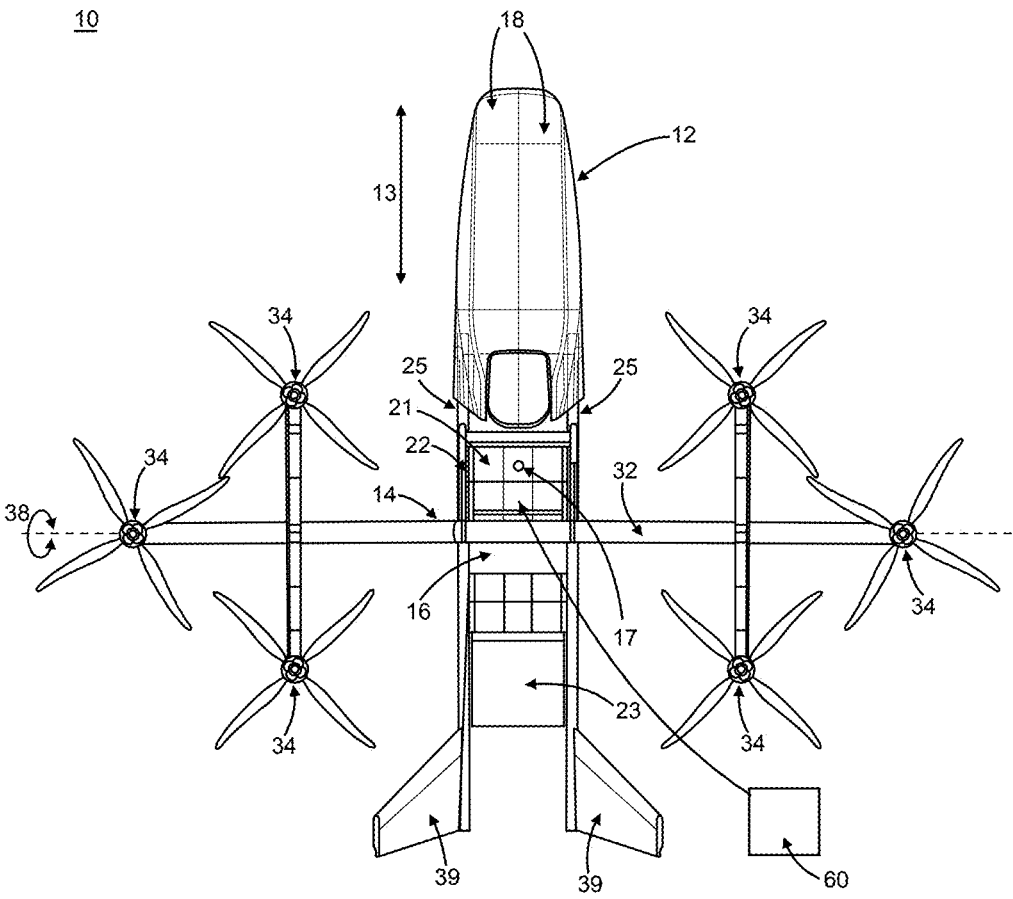
FIG. 2 is a schematic plan view of the aircraft of FIG. 1.
Figure 3:
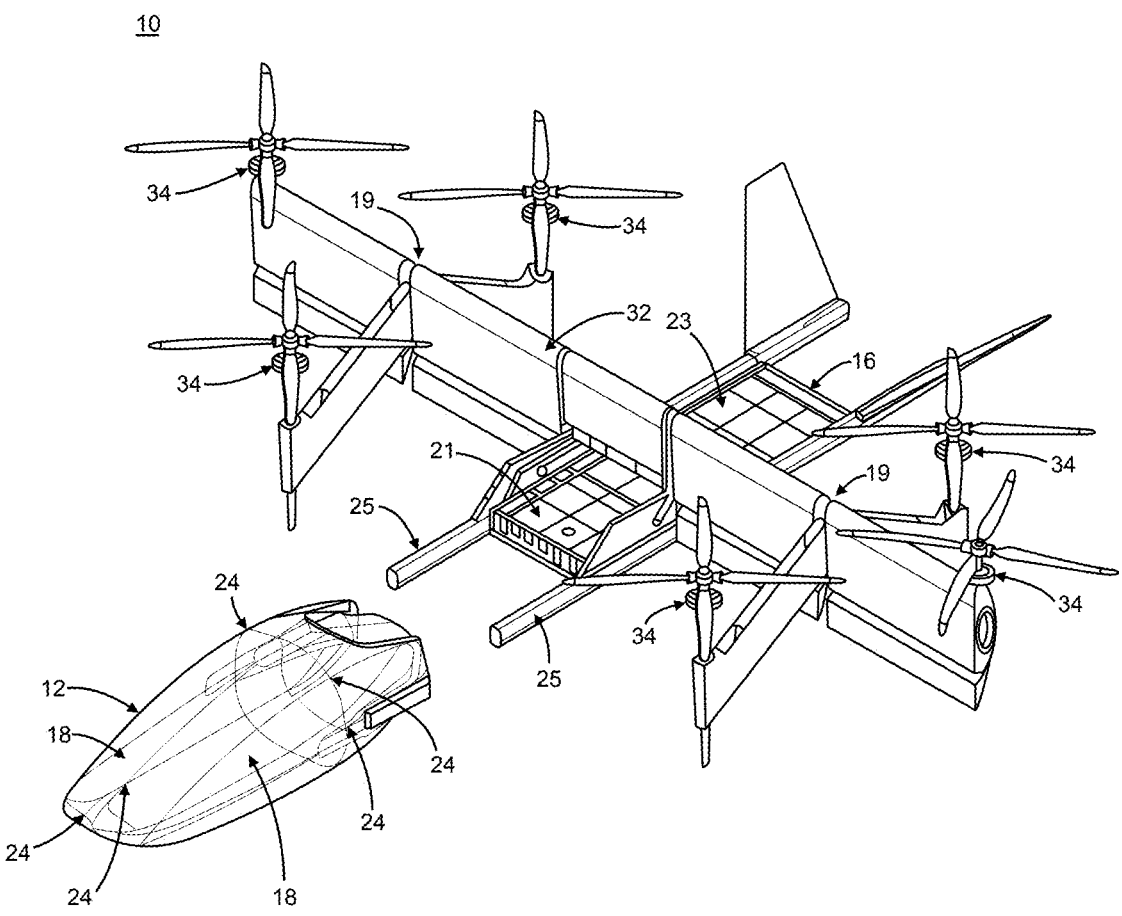
FIG. 3 is a schematic perspective view of the aircraft with the pod module assembly detached from the chassis module.
Figure 4:
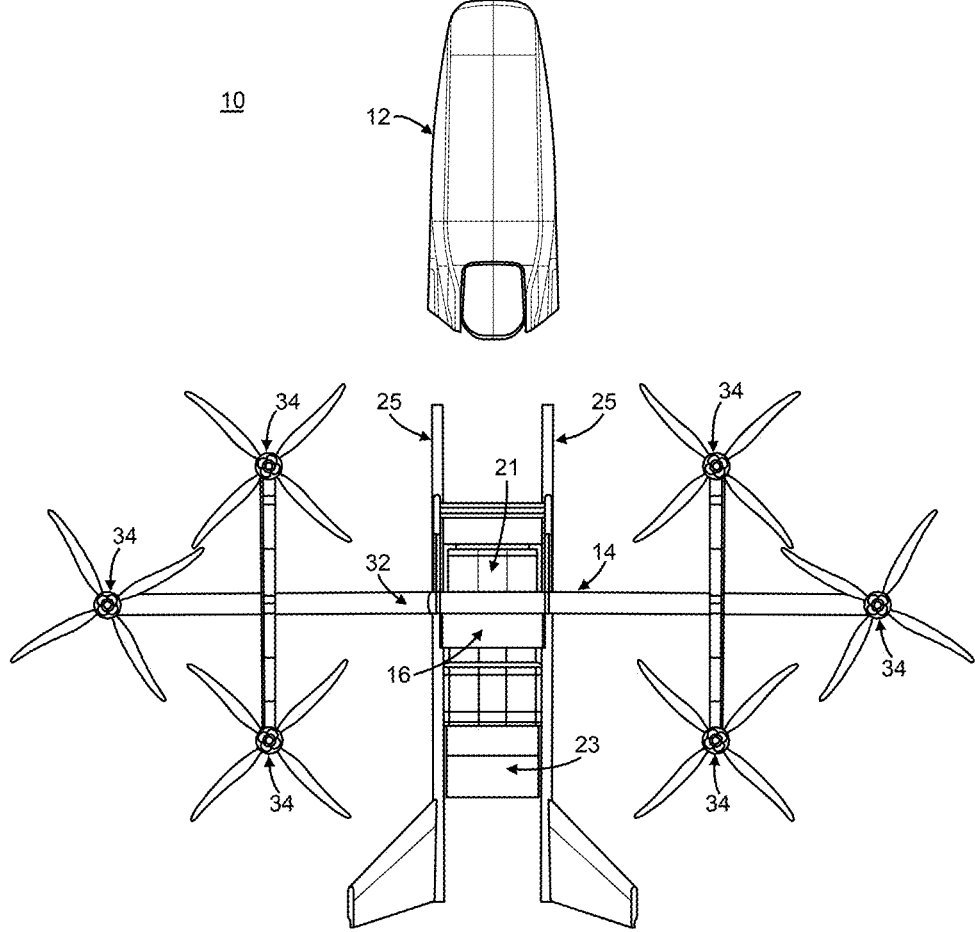
FIG. 4 is a schematic plan view of the aircraft with the pod module assembly detached from the chassis module.
Figure 5A:
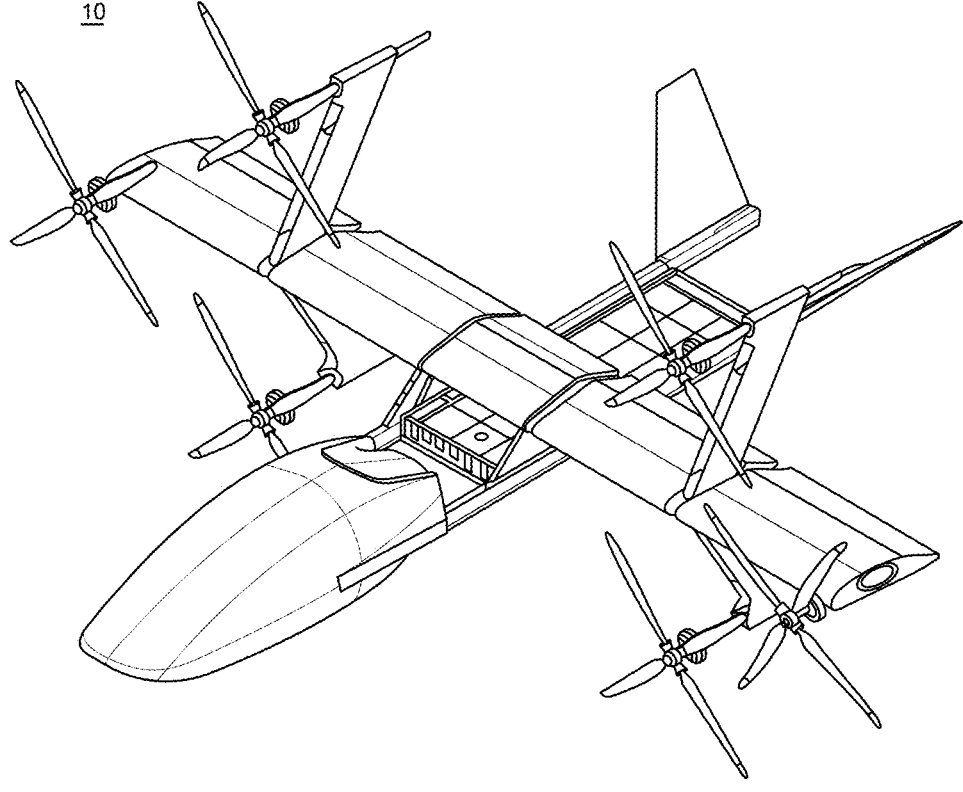
FIG. 5A is a schematic plan view of the aircraft with the pod module attached to the chassis and the wing module in a flight mode for horizontal flight.
Figure 5B:
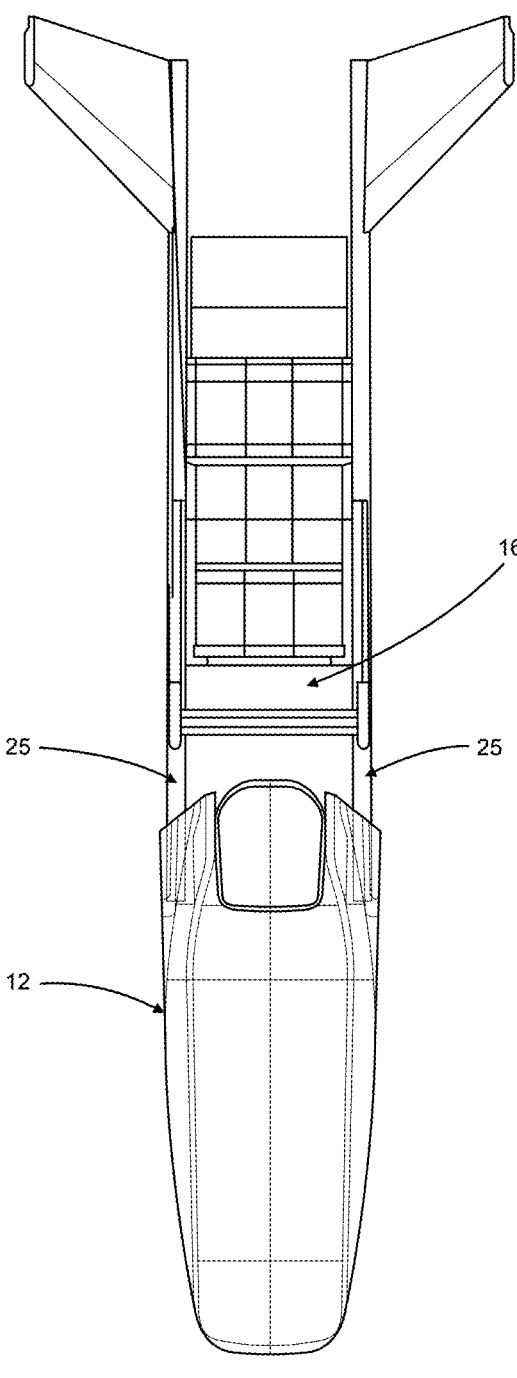
FIG. 5B is a schematic plan view of the pod module assembly attached to the chassis module, without the wings.
Figure 6:
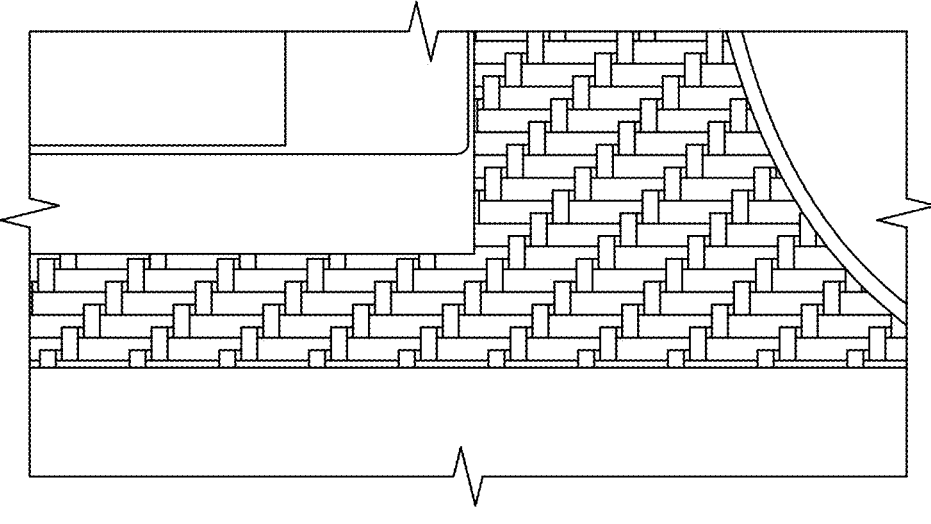
FIG. 6 is a schematic bottom view of a cover for the chassis module.
Figure 7:
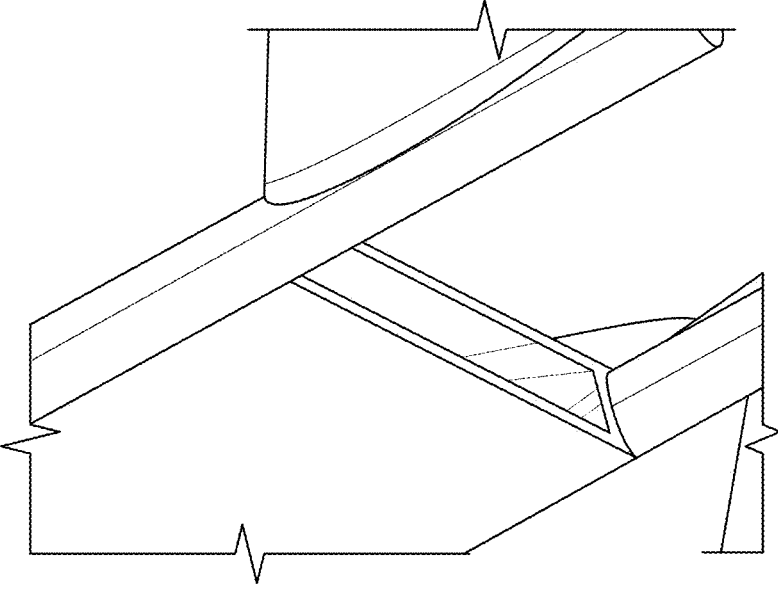
FIG. 7 is a schematic partial bottom rear perspective view of the chassis module.
Figure 8:
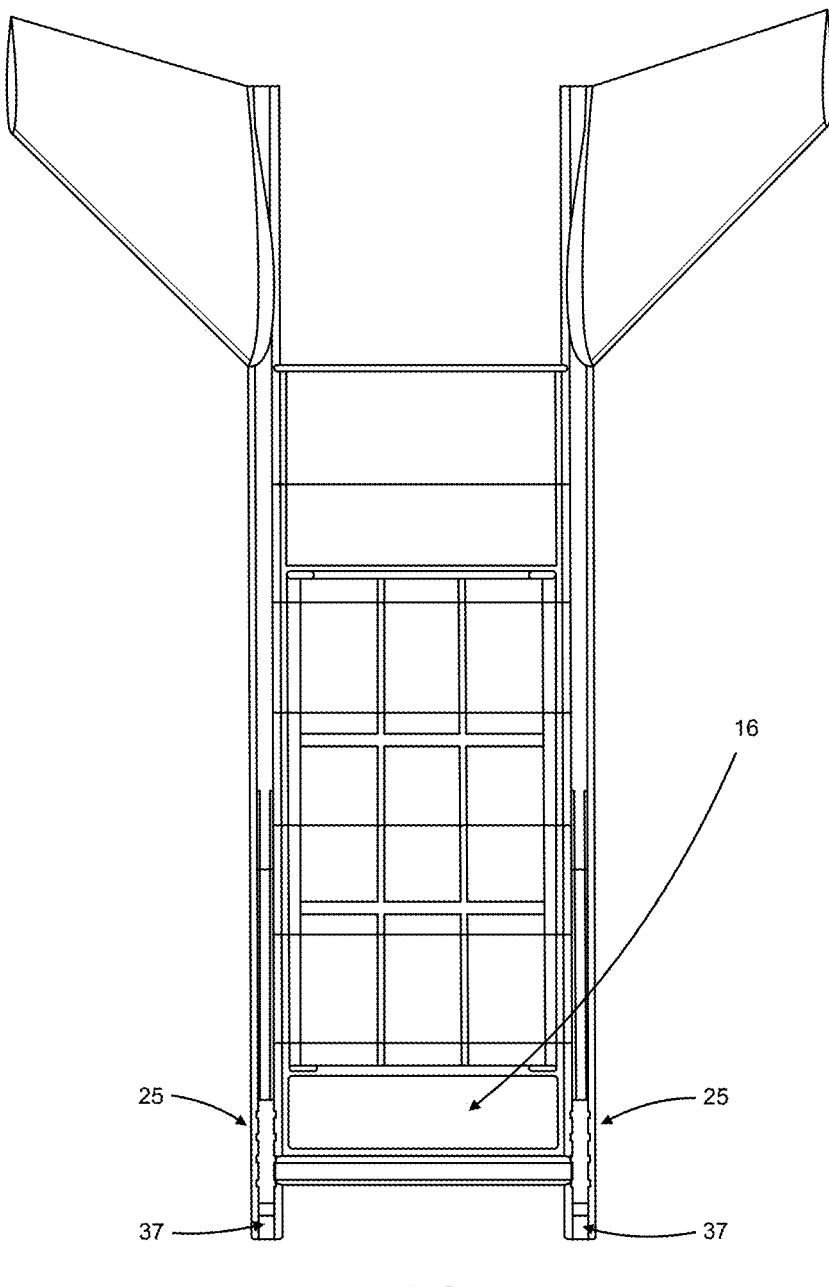
FIG. 8 is a schematic plan view of the chassis section.
Figure 9:
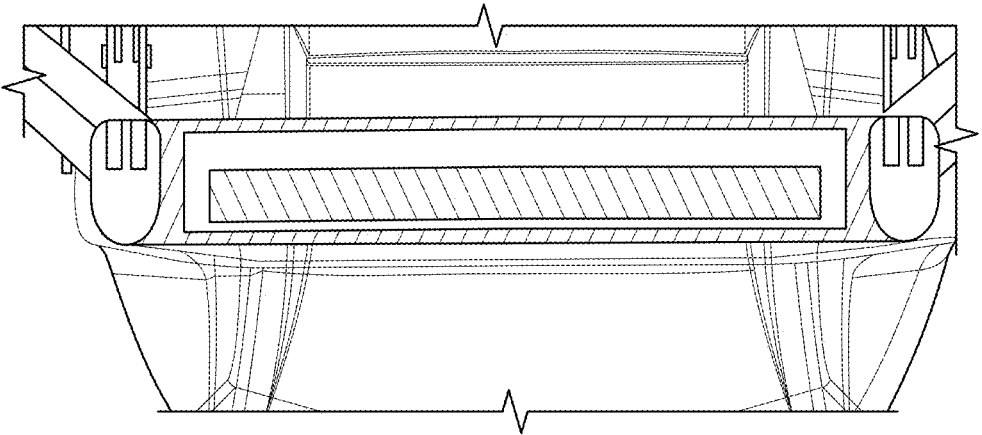
FIG. 9 is a schematic cross-sectional view of a battery tray of the chassis module.

1. Pod Module Assembly:

The pod module assembly 12 is configured to transport cargo and/or or passengers from one location to another. The pod module assembly 12 is configured to be selectively detachable from, and attachable to, the chassis module 16. With reference to FIGS. 1 and 2, the pod module assembly 12 is shown as being attached to the chassis module 16. With reference to FIG. 3, the pod module assembly 12 is shown detached from the chassis module 16. As will be explained in more detail below, one non-limiting embodiment of attaching and detaching the pod module assembly 12 to/from the chassis module 16 is illustrated in FIGS. 11-14.

The pod module assembly 12 may be configured to carrying one or more battery packs, i.e., energy storage devices, in a floor area thereof. In one non-limiting embodiment, the pod module assembly 12 includes a sub-floor structure containing a rack configured to interface with a battery pack or an enclosure for a battery pack to allow rapid removal and installation of the battery pack therefrom. In this embodiment, the battery pack may include a plurality of separate battery modules having the same voltage, lower voltage, or a higher voltage than a primary battery pack would have.

Referring again to FIGS. 1-3, the pod module assembly 12 is configured for multiple uses including, but not limited to, transportation of cargo or passengers, as a land-based module capable of self-power using a "skateboard" lower drive platform capable of being driven on public and private roads, as a trailer with wheels and as a watercraft. As such, the module assemblies may be interchangeable with other module assemblies. In one non-limiting example, the pod module assembly 12 is configured to be selectively attached to and detachable from the chassis module 16.

The pod module assembly 12 may be constructed of molded component parts including panels 18 having molded-in roll cage components 20 that are foam-filled and joined together to create a rigid structure that is selectively removable from the chassis module 16. The pod module assembly 12 may be formed from a multiplicity of component parts. In one non-limiting example. The pod module assembly 12 may be formed from four component parts that are joined together into a single assembly, using a variety of different tooling types. However, it should be appreciated that the pod module assembly 12 may be formed from more or less than four component parts. This pod module assembly 12 may also be configured to include integrated features such as tracks, seat bases, clear or opaque inner and/or outer panels 18, inner and/or outer panels 18 that are not clear or opaque, vertical and horizontal cargo separators, instruments for navigation and/or the like.

The roll cage components 20 may include, but should not be limited to, pultrusions, tubing, extrusions, and/or other elements that are combined to create an internal frame, i.e., a cage. The internal frame or cage may be fitted with a separate and external skin that includes one or more panels 18.

The roll cage component parts 20 may be formed from metal, plastic, composite, and/or other like materials. The roll cage component parts may be configured to essentially provide a frame defining at least one opening to maximize viewing panoramas. The openings may be fitted with clear or opaque panels 18 made from plastic, composite, glass, and/or other like components. In one non-limiting example, clear, plastic panels 18 are silicate treated. In another non-limiting example, clear, plastic panels 18 are non-silicate treated. In yet another non-limiting example, a preferred embodiment for the pod module assembly 12 is four component parts that are fit together like a "clam shell".

The pod module assembly 12 is configured to be adaptable to land, air, and/or water platforms. With respect to land travel, the module assembly may be configured to mount securely to a wheeled platform including a propulsion system, with steering and braking capability. This platform may be the equivalent of a "skateboard", where the propulsion system may be an electric vehicle (EV), hybrid and/or internal combustion engine (ICE). The pod module assembly 12 may be configured to interface electrically and/or mechanically with the wheeled platform through integrated electrical connectors.

For land travel, the pod module assembly 12 may include at least one track on each outboard side thereof. Each track is configured to engage with a respective counterpart on a single or multiple boom of the chassis module 16. The wing assembly 14 includes one or more wings 32, one or more turbine, electric or ICE engines (power sources 34), a rudder and stabilizer or equivalent 39, and/or the like. The pod module assembly 12 may include an adjustment system 22 that is configured to move the pod module assembly 12 horizontally (arrow 13 in FIG. 1), relative to the chassis module 16 and wing assembly 16, in order to allow adjustment of the center of gravity (CG) 17, and to balance the aircraft 10 during flight, such as a fully loaded aircraft 10 or a fully unloaded aircraft 10. The adjustment system 22 may be actuated electrically, hydraulically, and/or manually. Further, the adjustment system 22 may include one or more mechanical stops that are configured to lock the pod module assembly 12 in place, relative to the chassis module 16, prior to flight. The pod module assembly 12 may be configured to interface electrically and/or mechanically with the chassis module 16 through one or more electrical connectors, integrated in the pod module assembly 12.

As shown in FIG. 1, the aircraft 10 also includes a programmable controller 60 having a processor and tangible, non-transitory memory, which includes instructions for operation of the adjustment system 22 programmed therein. The memory may be any recordable medium that participates in providing computer-readable data or process instructions. Such a recordable medium may take many forms, including but not limited to non-volatile media and volatile media. The programmable controller 60 may be configured to execute the instructions recorded in the memory, in order to operate, in part, the adjustment system 22 and vary the CG 17 of the aircraft 10 in response to a sensed or input load of the pod module assembly 12, and/or other inputs to the controller 60. The controller 60 may also be programmed to regulate and coordinate operation of the power sources(s) 34, rotation of the wing 32, and the like.

Non-volatile media for the controller 60 may include, for example, optical or magnetic disks and other persistent memory. Volatile media may include, for example, dynamic random-access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 60 may also include a floppy disk, a flexible disk, hard disk, magnetic tape, any other magnetic medium, a CD-ROM, DVD, any other optical medium, etc. The controller 60 may be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 60 or accessible thereby may be stored in the memory and automatically executed to provide the required functionality of the aircraft 10.

With respect to water travel, the pod module assembly 12 may be configured to interface electrically and/or mechanically with an external floatable platform (not shown) to become a watercraft. More specifically, the pod module assembly 12 may be configured to function as an external floating platform, e.g., a structure with a structure that includes a pre-existing propulsion and guidance system, configured to accept, or otherwise mate to the chassis module 18. The guidance system can be usable in water and/or air to turn the watercraft. In one non-limiting example, the pod module assembly 12 is configured with a jet propulsion unit, similar to those used on jet skis, wave runners, and some boats. The jet propulsion unit may be secured to side rails of the pod module assembly 12. The propulsion system may be powered by a variety of energy sources including, but not limited to, batteries, hydrocarbon (HC) fuel, a fuel cell, and/or the like.

A multiplicity of individual panels 18 may be combined with discrete nodes 24 of accompanying geometry that are configured to join one or more component parts. These component parts may be assembled by inserting locators into the respective nodes 24, where the locators and nodes 24 are secured using structural adhesives and/or mechanical fasteners to provide a sub-assembly. A plurality of completed sub-assemblies are then joined together to create a completed pod module assembly 12.

All component parts may be bonded together or secured with mechanical fasteners or rivets such that no welds are required.

Combining the component parts via the joining of discrete nodes 24 and the attachment of the panels 18, provides continuous, circular load paths that transfer forces throughout the structure. Therefore, by way of a non-limiting example, a load on the rear of the structure of the pod module assembly 12 is distributed through side members, top members, and bottom members. Therefore, this continuous load path is configured to maximize a strength of the cage, while allowing the use of thinner, lighter materials and minimizing the number of transverse members.

In one non-limiting example, the pod module assembly 12 may be formed by molding, using a multiplicity of individual sections, e.g., four panels 18. Other construction methods are reviewed below.

Pultrusions (composite) or extrusions (metal) with a constant section and a constant radius can be created using a pultrusion process or an extrusion process depending on the material. The tooling for these processes is relatively inexpensive, as compared to other methods, such as metal stamping and injection molding. When pultruding and/or extruding, the parts are formed in continuous lengths, and trimmed to a final desired length.

As known to those of skill in the art, pultrusion is a manufacturing process for converting reinforced fibers and liquid resin into a fiber-reinforced plastic, also known as fiber-reinforced polymer (FRP). The pultrusion process allows for the continuous production of FRP structural shapes, in an automated and energy-efficient process by pulling fiberglass rovings through a resin bath or resin impregnator that completely saturates the reinforcements. The resin hardens from the heated steel pultrusion die, resulting in a strong and lightweight final product that follows the shape of the die.

The joining nodes 24 can be metal or composite and formed using a casting process, a forging process, an injection molding process or AM (Additive Manufacturing) to print the nodes 24 in the appropriate material without the need for tooling.

Metallic or composite nodes 24 or nodes 24 made from a combination of those materials are used to join the individual pultrusions; two, three or more pultrusions can be joined in this manner to create a sub-assembly. The panels 18 or pultrusions/extrusions slide into receptacles formed in the nodes 24; the nodes 24 contain two or more receptacles. The nodes 24 allow for insertion depth adjustment so that the sub-system and final assembly part geometry can be precisely controlled to a net distance for all key dimensions.

The nodes 24 and panels 18, or pultrusions and/or extrusions, may be bonded together using structural adhesives and/or mechanical fasteners, e.g., rivets and the like. Once insertion depths are precisely located, mechanical fasteners may be used to fix the elements until the adhesive cures. In some cases, fixturing may be used to securely fix the relative positions of the joined elements and eliminate the need for local fasteners.

An optional feature of this pod module assembly 12 as a flight module is to include a parachute capable of limiting a ground strike to <20 g's. The cage structure, in concert with the parachute, may be configured to act as an energy absorbing structure through the deflection of pultrusions that are curved to effectively act as leaf springs in a high level of acceleration "high-g" ground strike. The release of a parachute would require an electrical and/or mechanical release from a boom structure 25 of the chassis module 16, such that the pod module assembly 12 is independent of the flight elements including the boom(s) 25, wing(s) 32, and propulsion unit(s) 34.

Figure 10:
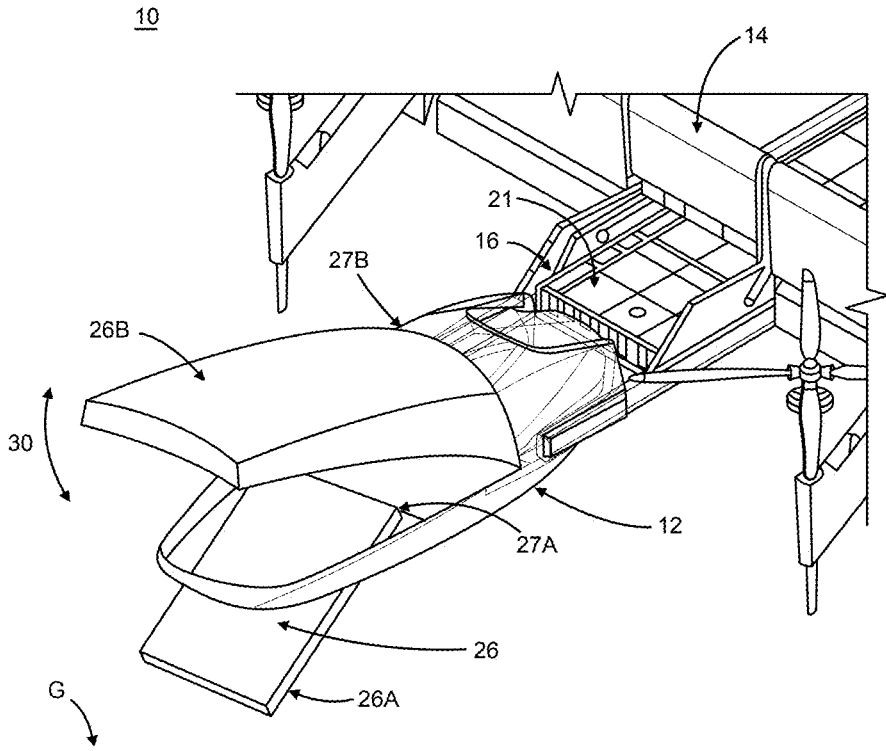
FIG. 10 is a schematic partial front perspective view of the aircraft.

Referring now to FIG. 10, in another non-limiting example, a front of the pod module assembly 12 may include at least one movable element 26, such as a lower element 26A and/or an upper element 26B, that are configured to move apart from one another (indicated by arrow 30) to open and create a walkway for loading cargo or passengers. The lower element 26A may be configured to swing downward and be supported by the ground G when in a fully down position. The lower element 26A may be configured to serves as a ramp for loading and unloading the aircraft when in the fully down position.

The upper element 26B may be configured to rotate upward, opposite the ground, to maximize headroom for a passenger or for cargo personnel. A preferred hinge point 27B for the upper element 26B may be aft of a hinge point 27A for the lower movable element 26A. Positioning of the hinge points 27A, 27B this way may improve access to an interior of the pod module assembly 12. The movable elements 26 may also include a side door and/or a rear door. The movable elements 26 may be securely affixed to one another using a mechanical latching system. Such a mechanical latching system may be configured to be secured manually, just prior to departure, and may be similar in concept to the latching protocols on commercial airliner doors. The mechanical latching system may be configured to be secured externally, by a flight assistant, by the pilot, and/or by using an automatic/remote mechanism. The mechanical latching system may be configured to override all flight modes, until the mechanical latching system is secured by either a ground-based flight crew member or the pilot and has been positively identified as secure using an electrical interface that completes the latching circuit, the craft power modules 34 are inoperable.

Another key feature of this design is the ability to form a sealed, fully isolated pod that is capable of floating in water independent of an external hull. This concept uses sidetracks to mount a propulsion system capable of providing thrust and turning capability such as a jet boat power module 34.

The pod module assembly 12 is joined to and disconnected from the chassis module 16 using a quick connect system 62, such that the pod module assembly 12 can be quickly removed and replaced. A shuttle designed for the pod geometry may be configured to capture the pod module assembly 12 as it is released from the chassis module 16. The shuttle is configured to then transfer the pod module assembly 12 from the remaining components of the aircraft 10 (i.e., the wing assembly 14 and the chassis assembly 16), to a ground location or vice-versa. The attachment mechanism 62 may be magnetic and/or mechanical. Electromagnets allow strong retention and quick release. This system may be configured to use a back-up mechanical system. Mechanical retention systems may include quick release shear pins, incorporating one or more pins, engaging with a coupler on the chassis module 16.

FIGS. 11-13 illustrate a loading sequence of using a quick connect system 62 for attachment of the pod module assembly 12 to the chassis module 16 using a series of spring-loaded latches 64. As illustrated in FIGS. 11-13, the spring-loaded latches 64 may be rotary, spring-loaded latches. An attachment plate 66, defining a plurality of receiver openings 68, may be attached to the fuselage of the chassis module 16, while a mounting plate 70 is attached to the pod module assembly 12. The latches 64 may be operatively attached to the mounting plate 70.

Each latch 64 includes a finger 72 extending between an attachment portion and a latching portion. The finger 72 is pivotally attached to a housing 74 at the attachment portion. The latching portion includes a ramp 84 that extends between an edge end 80 and a lip 82.

In order to attach the pod module assembly 12 to the chassis module 16, the pod module assembly 12 is moved in a linear direction 86, toward the chassis module 16 (see FIG. 11) until the ramp 84 contacts the attachment plate 66 at the receiver opening 68 (FIG. 12). As the pod module assembly 12 continues to be moved in the linear direction 86, contact between the ramp 84 and the attachment plate 66 causes the finger 72 to pivot about the attachment location, relative to the housing 74, until the lip 84 is all the way through the respective receiver opening 68. A biasing device 88 may be operatively attached between the housing 74 and the finger 72 to continuously pivotally bias the finger 72 in a latching direction 90. As such, when the lip 84 is all the way through the respective receiver opening 68, finger 72, including the latching portion, is pivoted about the attachment location, such that the lip 84 engages a portion of the attachment plate 66 to lock the pod module assembly 12 to the chassis module 16.

Figure 14:
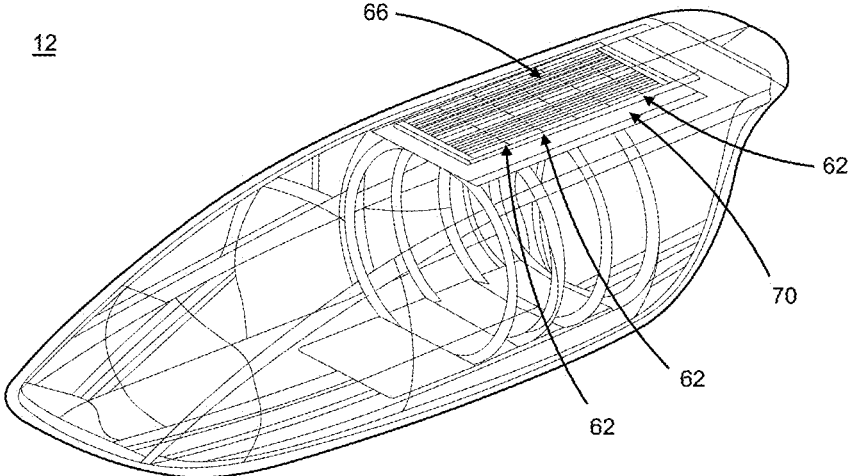
FIG. 14 is a schematic perspective view of the pod module.

Referring now to FIG. 14, plates 66, 70 for the quick connect system 62 of the pod module assembly 12 and chassis module assembly 16 are illustrated. One or more latches 64 may be used to achieve the engagement between the pod module assembly 12 and the chassis module 16. In the embodiment shown in FIG. 14, six latches 64 are shown. It should be appreciated that more or less latches 64 may be used. Additionally, location of the latches 64 and the receiver openings 68 may be reversed.

In one non-limiting example, the module may be used as a land-based wheeled vehicle by mechanically attaching a "skateboard" power module 34 containing a drive motor(s), steering, energy source, suspension and/or braking, and the like. In another non-limiting example, the module may be used to transport for aircraft cargo and/or passengers, by attaching a boom section that includes a wing(s), a boom, a power module 34(s), an energy source(s), a landing apparatus, and/or a rudder/stabilizer or equivalent components, and the like. In yet another non-limiting example, the module may be used as a watercraft, by including a pair of side-tracks and a power module 34 that is configured to provide thrust and turning capability to two sidetracks.

2. Wing Assembly:

The wing assembly 14 includes at least one wing 32 and a plurality of propulsion mechanisms 34, e.g., engines. With reference to FIG. 1, the wing assembly 14 is attached to the chassis module 16 via a hinge assembly 36. The hinge assembly 36 is configured to move the wing about an axis of rotation 38 when transitioning between vertical and horizontal flight.

The wing 32 may be formed to include separate, fully isolated, and sealed compartments by using pultrusion or extrusion processes. These compartments may be configured to serve as conduits. Potential uses of these conduits may include, but should not be limited to, routing electrical wiring and mechanical linkages as well as providing grounding for external energy, such as a lightning strike.

In one embodiment, the wing may be constructed via joining and assembling a rib-less, multi-component section (hereinafter "section"). The section may be configured to include power module 34 mounting provisions 19 and integrated conduits, as will be explained in more detail below. In another embodiment, the wing 32 is constructed via a single, continuous component formed via pultrusion or extrusion.

In another embodiment, an air foil includes a plurality of joined section that are wrapped to create a single, integrated part, e.g., an aircraft wing. In another embodiment, agricultural implements, such as sprayer booms and harvesting equipment. Other embodiments include lightweight, portable bridges for military or civilian use, ship hulls and temporary or permanent walls for rapid building construction.

Formation of the Sections:

The implementation of this design may include a multiplicity of individual long, slender sections that are formed by wrapping material around mandrels, typically rectangular or semi-rectangular in section, and having a length to width (L/W) ratio that is generally greater than 30:1 in order to provide a structure. The sections may be combined in sets of two, three, or more sections, using a plurality of spacers between each set of sections, to create a form that serves as a male tool.

These sections may also be formed by incorporating a variety of other manufacturing and/or processing methods, including, but not limited to, pultrusion, extrusion, and filament winding, and then wrapped to create the male tool for wrapping the multiple parts to form a completed air foil assembly.

The male tool created by joining the individual sections and the spacers into a single assembly is then wrapped with material to create the final part shape. The length to width (L/W) ratio for the completed fully wrapped part is typically less than 10:1.

All components are then bonded together or secured with mechanical fasteners or rivets, such that welding is not required.

The wing shape is adaptable to all wing geometries, including, but not limited to, a constant section, a tapered section, and a variable angle of attack, i.e., chords rotated at a constant or variable angle relative to a specified reference datum or datums. The wing tilts from a vertical orientation to a horizontal orientation.

The segments may also be used to provide ground-based structures, e.g., a portable military bridge. These ground-based structures can be virtually any section geometry, i.e., square, round, oval, or a combination, with a wide range of aspect ratios, Width/Length, e.g., 1:1, 20:1, 1:30.

This design may also be used to create discrete I-beam section, at each section intersection, which run the length of a completed part. The "I-beam geometry adds stiffness in both the longitudinal and transverse directions. In one non-limiting example, when incorporated into a wing of an aircraft, the need for added structural ribs is eliminated, while substantially reducing assembly complexity, as compared to traditional "rib and spar" construction.

Figure 15:
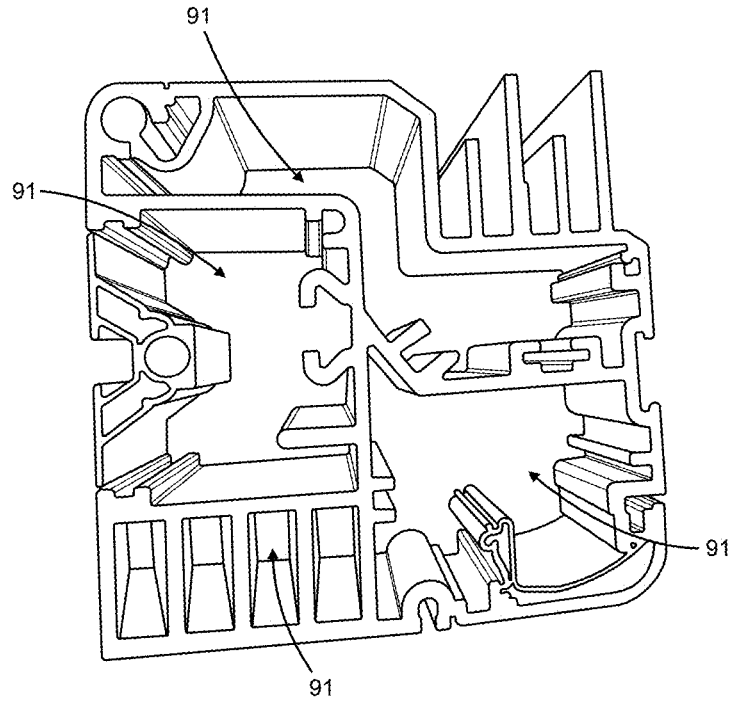
FIG. 15 is a cross-sectional view of channels for a spar.

Another key feature of this design is the formation of sealed, isolated conduits 91 that can be used for packaging electrical components, wiring, fluid and fluid hoses, batteries, fuel, ballast, mechanical hardware or any other component(s) required for flight. These conduit channels, in the preferred embodiment, run transverse to a longitudinal centerline of the chassis. These channels may be formed from a wide variety of materials, including ferrous, non-ferrous, and composites and utilize manufacturing processes such as pultrusion, extrusion, filament winding, molding as well as emerging applicable processes. An exemplary shape for these channels 91 is shown in FIG. 15.

Figure 16:
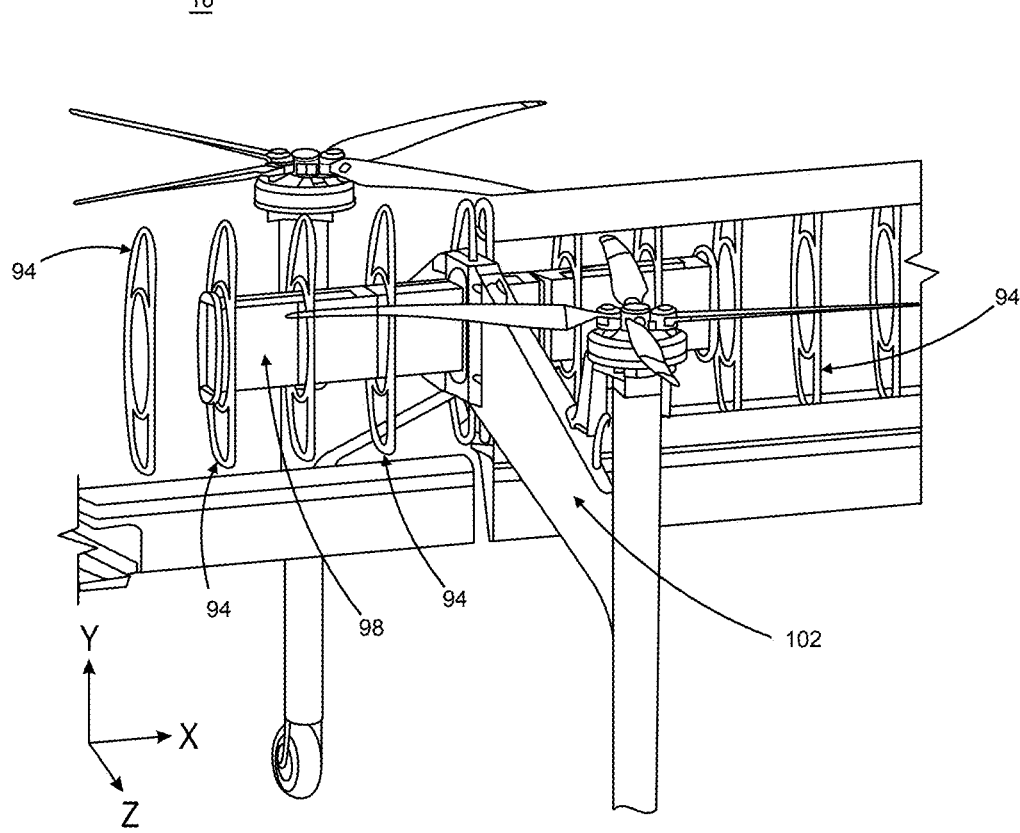
FIGS. 16-17 are partial sections of a wing with a module disposed inside.
Figure 17:
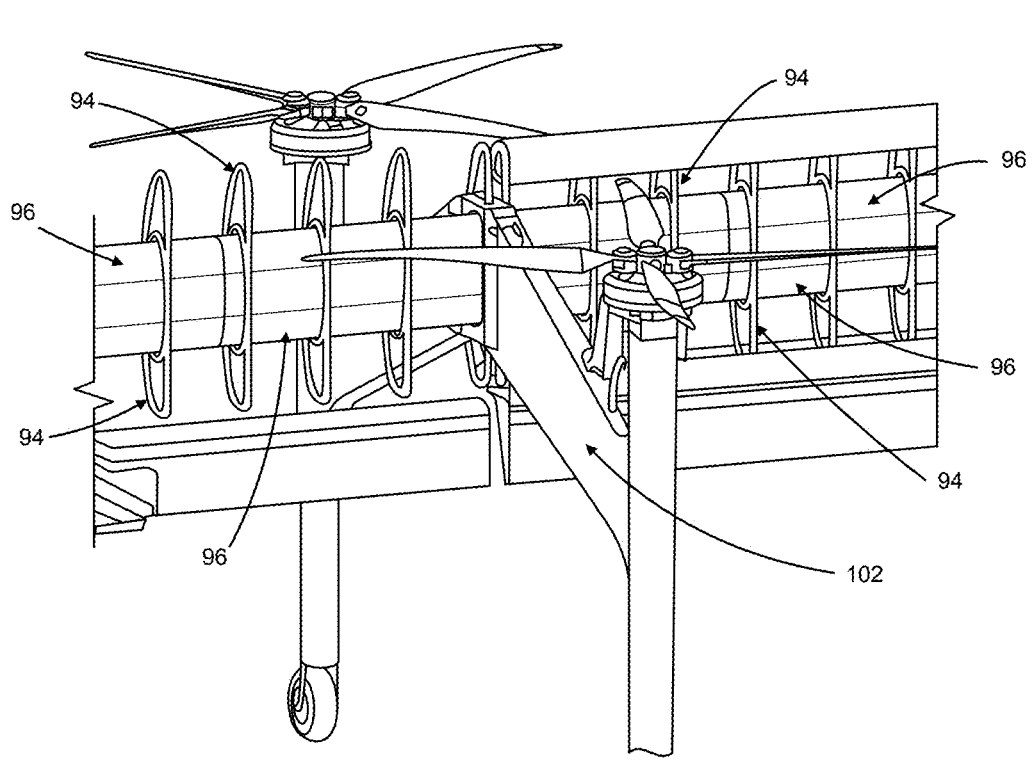
Figure 18:
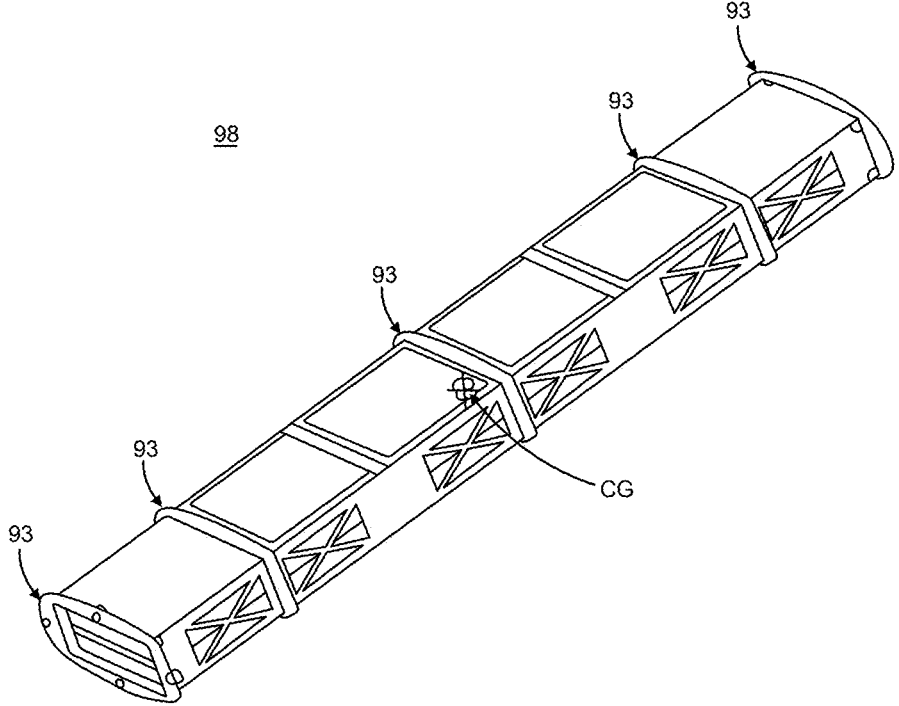
FIG. 18 is a battery module of FIGS. 16-17.

The wing spar can also serve as an accessible storage area for larger elements. FIGS. 16-18 illustrate a battery module 98 in a typical wing spar installation. A battery module 98 interfaces with the internal wing surface using one or more ribs 94 interfacing with side rails. The battery module 98 is fixed to the inside of the wing spar, which includes low friction elements that provide a low friction interface 96. The low friction interface 96 is configured such that the batteries can slide easily along the interface. The low friction elements can include, but are not limited to, ball bearings, roller bearings, tapered bearings or low friction materials such as polytetrafluoroethylene (PTFE) more commonly known as TEFLON, which is a registered trademark of Dupont.

This module interfaces with the wing spar as shown in FIGS. 16-17. The module 98 includes fixed or adjustable stops near a plane longitudinal centerline and has adjustable stops on an outboard end that are configured to lock the battery module 98 into position. These stops prevent battery module 98 displacement in a transverse direction and allows for optimizing a center of gravity about an "X" axis.

This "ribless" design contributes to lighter weight, substantially fewer parts count, reduced assembly time, lower labor rates, net build construction, lower tooling costs and improved quality as compared with traditional airplane wings.

Because these advantages can be applied to most load bearing structures, there are many other potential applications, such as, but not limited to, agricultural implements and load bearing structures, such as bridges and buildings.

Referring now to FIGS. 16-17, the motor spar is connected to the wing 32 using a pylon 102. The shape and construction of the pylon 102 can utilize multiple geometries and a variety of materials. A rectangular section using balsa laminated with carbon fiber composite panels is one approach. Another design may utilize a carbon fiber laminate with an elliptical shape. An elliptical design is shown on the plane in the below drawing.

Figure 22:
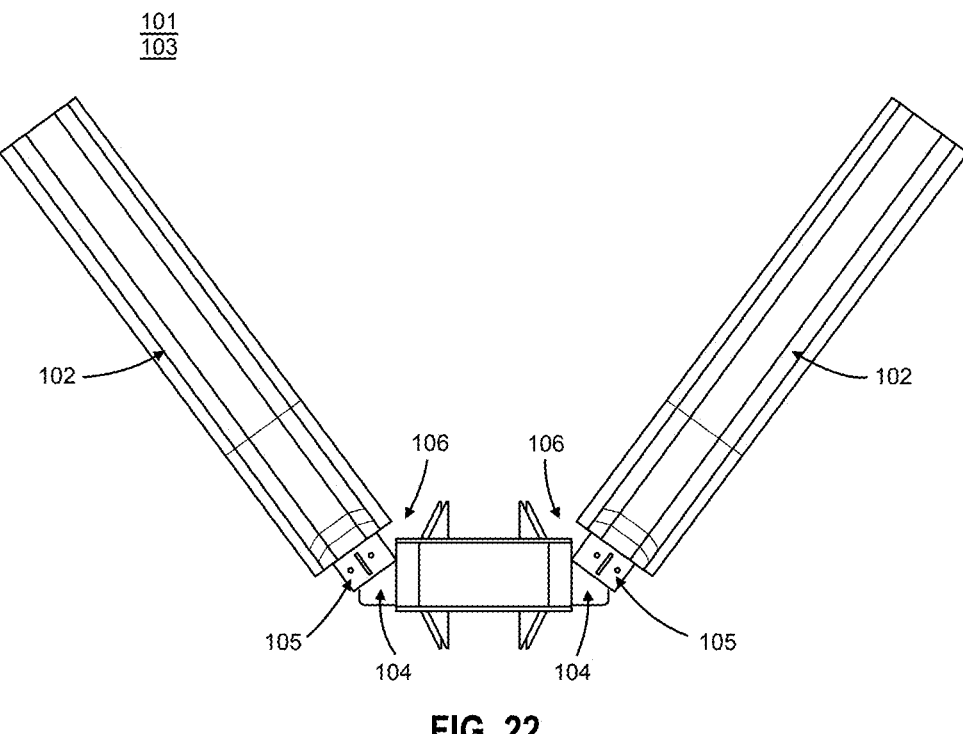
FIG. 22-25 are schematic views of pylons and hinge mechanisms for mounting motors to the wing assembly.
Figure 23:
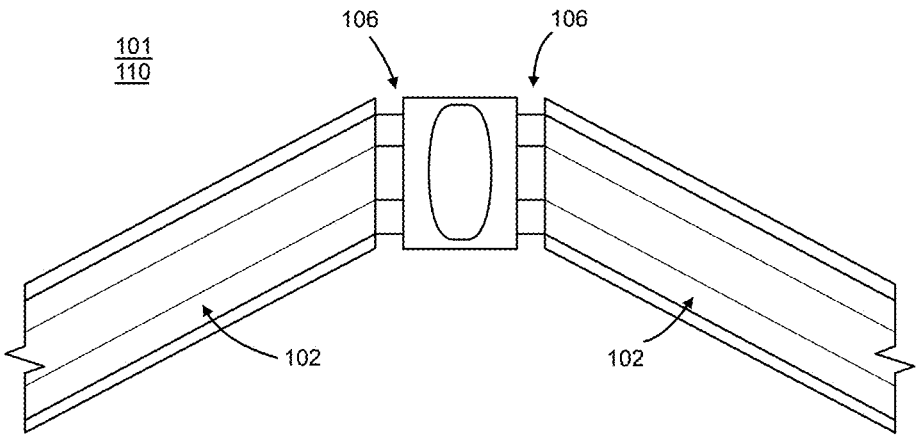
Figure 24:
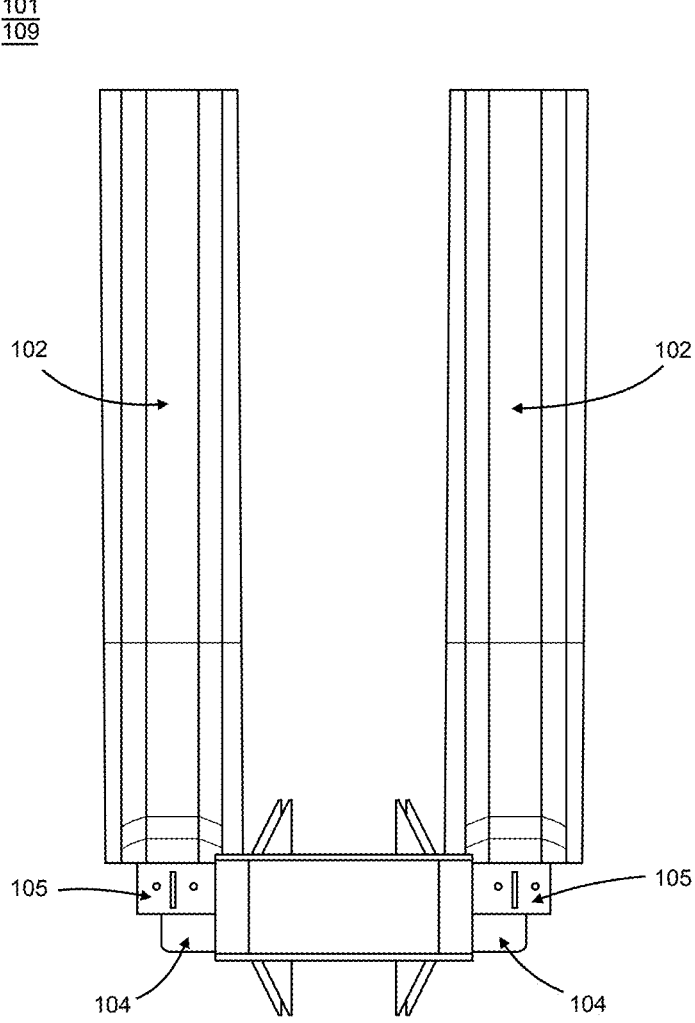

It is desirable to incorporate a folding feature into the Sigma pylon assembly 101 to minimize storage space required to store or transport the plane 10. A hinge design 106 capable of permitting pylon 102 rotation is shown in FIGS. 22-24, which incorporate the elliptical pylon geometry. The hinge design 106 is independent of the actual pylon section geometry, i.e., this hinge design 106 can also be applied to round, square, rectangular or any variant of those shapes. The Sigma pylon rotation in this configuration is about a "Y" axis, the transverse direction.

Figure 25:
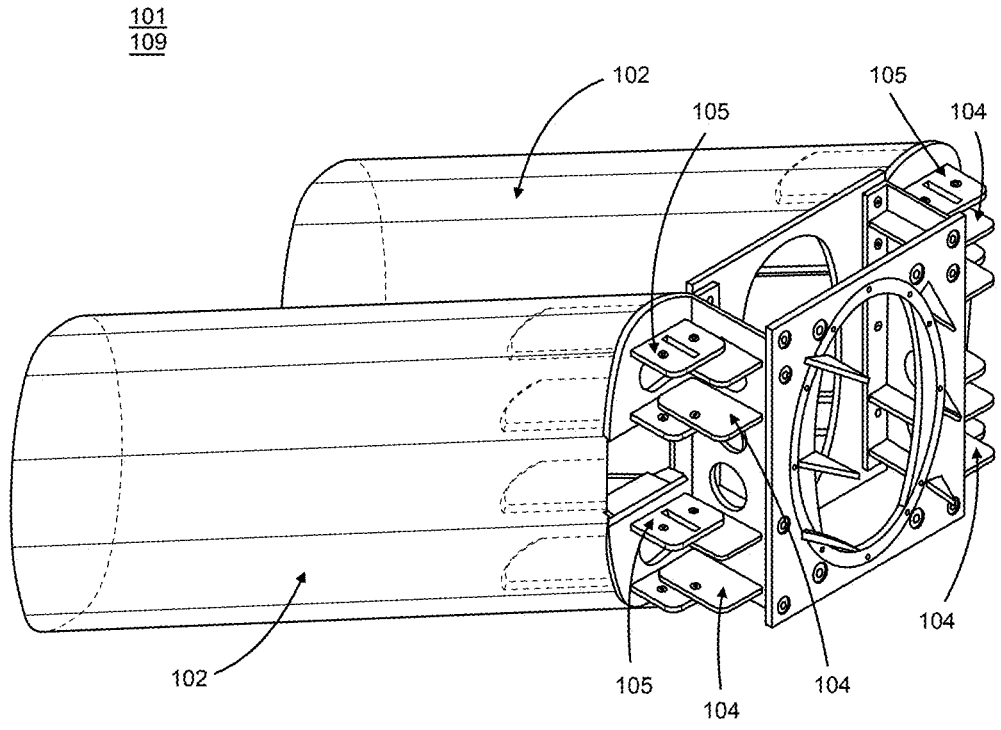

The pylon rotation can be clockwise or counterclockwise. In one non-limiting example, the motor and propeller are removed in a stored configuration. It is also possible to rotate and store the pylons with the motors attached, i.e., only the propeller is not in place. This pylon design incorporates a hinge mechanism 106 to allow the motor pod pylon assembly to be folded. FIG. 22 illustrates a top view of the pylons in a partially folded position 103. A first set of plates 104 are fixed to the wing spar; a second set of plates 105 are configured to rotate relative to the first set of plates 105. FIGS. 24-25 illustrate the pylons in a folded position 109. More specifically, FIG. 24 illustrates the Sigma pylons 102 in their fully folded position 109 which is generally parallel with the wing spar. In the folded position 109, the pylons 102 are rotated approximately 90 degrees relative to their nominal flight position 110, shown in FIG. 23.

Construction/Joining/Assembly

Two or more long, slender mandrels, which can be one piece or modular, e.g., a leading-edge tool, a trailing edge tool and a middle element locating the trailing and leading-edge tools relative to each other, typically with length to width (L/W) ratios greater than 30:1, are wrapped with a metallic or composite material to create individual spars that have interfacing surfaces along one or more planes. The fabrication of these parts is similar to production of a carbon fiber boat mast, a proven process that typically incorporates zero draft in the part pull direction. Therefore, in the case of an airfoil shape, the preferred embodiment, the external shape can be fully optimized aerodynamically.

When using sections constructed using another tooling protocol, e.g., pultrusion, fixtures would be used to locate and secure the sections in place relative to the final required wrapped shape. In this preferred embodiment, the fixtures would be secured at each end of the pultruded sections and engineered to create a net build, i.e., they would be adjustable relative to datums to create a net shape after the individual sections are wrapped to create the final part shape. Utilization of this manufacturing process also allows for local reinforcements, as determined by analysis, to minimize the part weight vs. constant section material. For non-homogenous materials, such as carbon fiber or fiberglass cloth, the isotropic and anisotropic properties can be directionally optimized to create the strongest cross-sections while minimizing weight. This is a significant advantage over metal wings that use materials with homogenous physical properties and an advantage over traditional spar and rib wing designs utilizing materials with directional properties such as carbon fiber.

Metallic or composite spacers or a combination of those materials are used to join the individual spars; two, three or more spars can be joined in this manner. An "I" beam is created at each intersection of two spars. An additional feature is the incorporation of discrete C-shaped sections, formed via pultrusion, that close out the gaps between the individual spars created by the spacers and that serve to form the wing surface during the final wrapping process. These C-shaped sections affix to the top and bottom of the spacers which have a matching male shape that positively locates the C-shaped sections. This replaces full length spacers and typically eliminates 80% of the spacer material, reducing cost, assembly complexity and weight vs. a full-length spacer. The multiple, discrete C-shaped section pultrusion geometries can be combined in a single pultrusion tool to reduce tooling costs and piece costs.

The completed, multiple spars, are joined using fixtures on each wing end which locate the completed spars, removed from their individual mandrels, relative to each other and to the centerline of a center mandrel which is wrapped with a completed spar. These fixtures create a consistent net build shape for the final assembly. The combined spars form the tool for wrapping the part to produce its final shape. A centerline stud affixed to the centermost mandrel serves as the rotational centroid. The combined spars and spacers, joined using structural adhesives, rivets, mechanical fasteners or some combination of these attachment options, are then wrapped with an outer layer consisting of one or more sheets of composite or fabric cloth, plastic based sheeting, steel, or aluminum sheet to create the final assembly.

The material wall thicknesses are adjusted for the combination of the spars and the final wrapped shape. The wrapping material can include electrically conductive layers capable of grounding external energy such as lightning strikes. The leading-edge surface, in the case of the preferred embodiment, can also be reinforced relative to the remaining air foil surface to manage impact energy, e.g., a bird strike.

After the multiplicity of spars are fully wrapped to create a single, one-piece assembly, the center mandrel is removed from the assembly completing the build process. This sequencing allows the complete part to be designed without needing to compensate for draft; the final release from the mandrel is a single spar element with an L/W ratio typically >30:1 which has been proven in the mast industry to require no draft for part removal from the mandrel even though the final geometry may have a <5:1 L/W ratio.

In one embodiment, an air foil includes multiple joined sections that are created using either one-piece tools, multi-piece tools, and/or quick release tools that are wrapped to create a single integrated part, e.g., an airplane wing. This embodiment could include a tapered wing, a straight constant section, a "twisted" chord design or a combination of one or more of these design elements.

Integral to the wing design is the capability of mounting multiple power sections that attach to the completed wing through unique spacers made with high strength materials, e.g., carbon fiber plates with internally threaded metal inserts. The number of power sections is typically four to eight sections. Additionally, two or more power sections may be attached to a structural mounting section that is then secured to the wing. Two or more of these 2 motor sections are bolted to the wing, e.g., one section with two motors locates one power section above the wing and one power section below the wing. See drawing below.

Another embodiment is agricultural implements such as sprayer booms and harvesting equipment. Other embodiments include lightweight, portable bridges for military or civilian use, ship hulls and temporary or permanent walls for building construction.

Integration Features:

The wing is configured to include separate, fully isolated, and sealed compartments that may serve as conduits to route and protect hardware, including wiring, mechanical hardware, and the like. Potential uses include routing electrical wiring, bus bars, and mechanical linkages, as well as provisions for grounding external electrical energy, such as a lightning strike.

Additionally, the wing assembly 14 may be configured to incorporate heating elements for heating surfaces of the wing 32 by using waste heat from the motors, inverters, and batteries, rejected to a coolant, and then routed through a leading edge of the wing 32. In a preferred embodiment, this would be a pultruded section with an integral coolant passage within the wing assembly 14.

The chassis module 16 may include one or more booms. The wing assembly 14 may be operatively attached to the chassis module 16. The wing assembly 14 may include one or more wings. The wing assembly 14 and/or the chassis module 16 may also include one or more power modules 34, one or more slidable modules that are configured to act in concert with one or more of the booms, a fixed or retractable landing gear that can be wheeled or non-wheeled, one or more floats configured to provide sufficient buoyancy to keep the aircraft afloat, a stabilizer/rudder or equivalent, and/or a rear device configured to provide sufficient thrust to balance of the aircraft during positive and/or negative vertical flight. This assemblage of components is configured to transport a cargo/passenger module, i.e., the pod module assembly 12, as described above, and is configured to interface with the chassis module 16 during vertical and horizontal flight.

A slidable energy module 21, i.e., an energy source or battery pack, is provided as an energy source to the aircraft 10. This energy module may also be a fuel cell or a fuel burning generator and the like configured for powering electric motors. The energy unit is configured to translate fore and aft (see arrow 13), relative to a bottom 23 of the chassis module 16 elements. The slidable element is shown in the forward position, and is configured to translate rearward, as required.

The materials may be formed from metal, plastic, composite, and/or other like materials. One non-limiting embodiment provides a chassis module 16 including a pair of composite tubes, i.e., booms 25, extending in spaced and parallel relationship to one another. Other embodiments include a single tube or more than two tubes of a geometric shape including but not limited to square, rectangular, oval and elliptical sections. Tracks 37 are located along inner plan view tangents of the tubes 25. These tracks 37 are configured to be used with a variety of pod module assemblies 12 that are affixed and slidable relative to the booms 25 including but not limited to, a hybrid power generator and a fuel source; batteries (i.e., energy storage devices); luggage; cargo; and the like. These may be used singularly of in multiples. Additionally, the tracks may be optionally positioned at a rear of the chassis module 16, or on booms located on the outboard portion of the composite tubes. These tracks may be configured to serve as mounting points for rear aircraft control surfaces, such as a rudder and/or a stabilizer.

The chassis tube(s) may also include sources that capable of generating thrust and/or a system and a method of directing the thrust vector. There is an inlet and an exit for one or more of these devices in each boom. The thrust may be vectored in an omnidirectional manner so that any aircraft directional control requirement can be met with this device or devices. This can be an electric fan in its preferred embodiment.

A wing(s) 32 are affixed to the chassis module 16 through physical interfaces, i.e., hinge assembly 36, shown in FIG. 1. The preferred embodiment is two tubes 25, a single wing 32, and a multiplicity of power modules 34 attached to the wing 32. The wing 32 rotates about a central transverse axis 38 to position the power modules 34, i.e., electric motors driven by close-coupled batteries 21, with propellers 34A to directing thrust vertically, horizontally or at an angle varying between vertical Y and horizontal X.

The landing gear 33 may be affixed to the chassis module 16, as illustrated in FIG. 10, or to the wing assembly 14. One embodiment includes installing the wheel/tire/suspension assembly in the vertical motor spar. The landing gear 33 may be fixed or retractable, and may include a wheeled, a non-wheeled, and/or a float system, such as pontoons or retractable wheels.

This aircraft 10 design concept combines one or more tubes 25 for the chassis module 16, a system or mechanism configured to attach the pod module assembly 12 to one or more tubes 25 of the chassis module 16, a system or mechanism for mounting the wing assembly 14 to the chassis module 16. The wing assembly 14 includes one or more power modules 34, each containing a motor or engine driving a propeller 34A, a system configured for stabilizing the aircraft 10 on the ground and/or on a body of water, a system or mechanism configured for attachment of a rear exiting thrust system thereto (typically an electric fan), while providing an inlet and a 360 degree rotatable thrust exit path, and a system or mechanism configured to securing a stabilize, rudder, or equivalent to the boom 25, along with a system or mechanism configured for attaching and securing a variety of additional modules, including battery packs, range extenders, such as fuel cells and fuel burning generators and cargo, to the chassis module 16, while allowing these additional modules to displace in the fore and aft direction (see arrow 13 in FIG. 1), relative to the pod module assembly 12.

The chassis module 16 elements preferred embodiment uses pultruded beams but may also use mandrels for their construction as well as filament wound, automated layup or other high run rate processes; these are trimmed to the desired geometry after being formed. The preferred material is carbon fiber filled composite. Plastic, composites or metal are potential material types for both the mandrels and the finished parts. The preferred joining protocol is bonding using structural adhesive and mechanical fasteners, including rivets, to join the assemblies together and to secure parts such as tracks.

Figure 19:
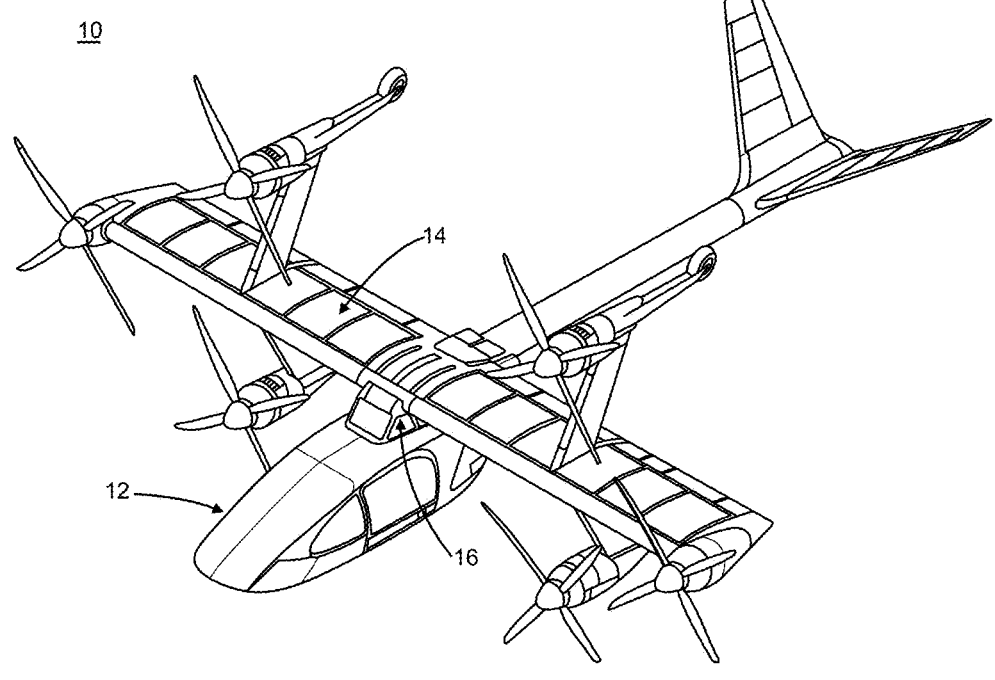
FIG. 19-21 are schematic view of another embodiment of the aircraft.
Figure 20:
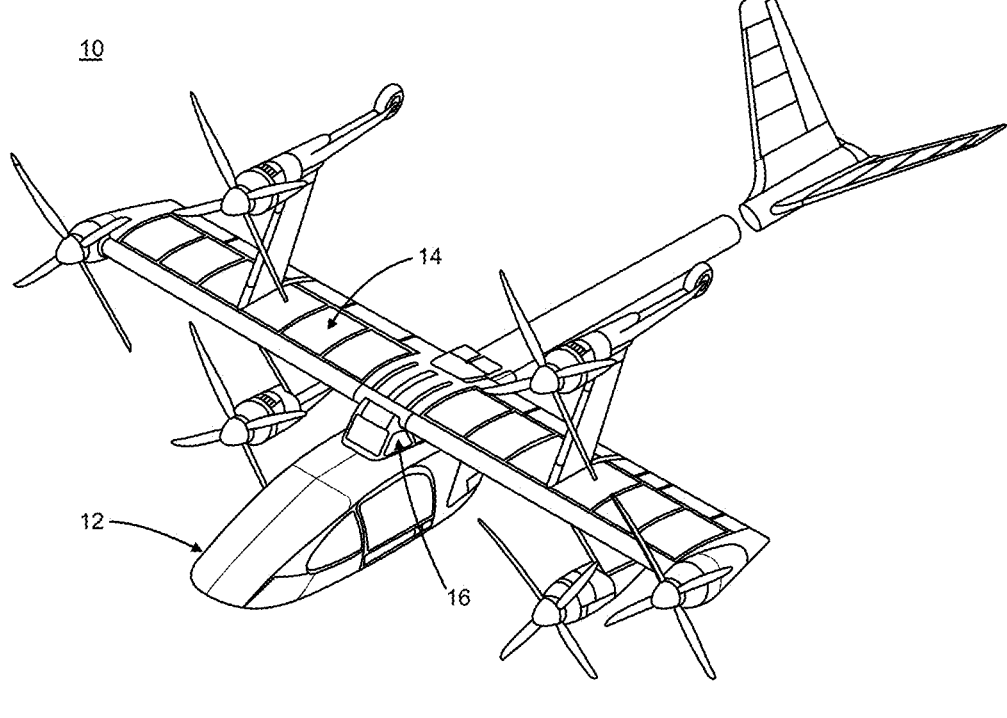
Figure 21:
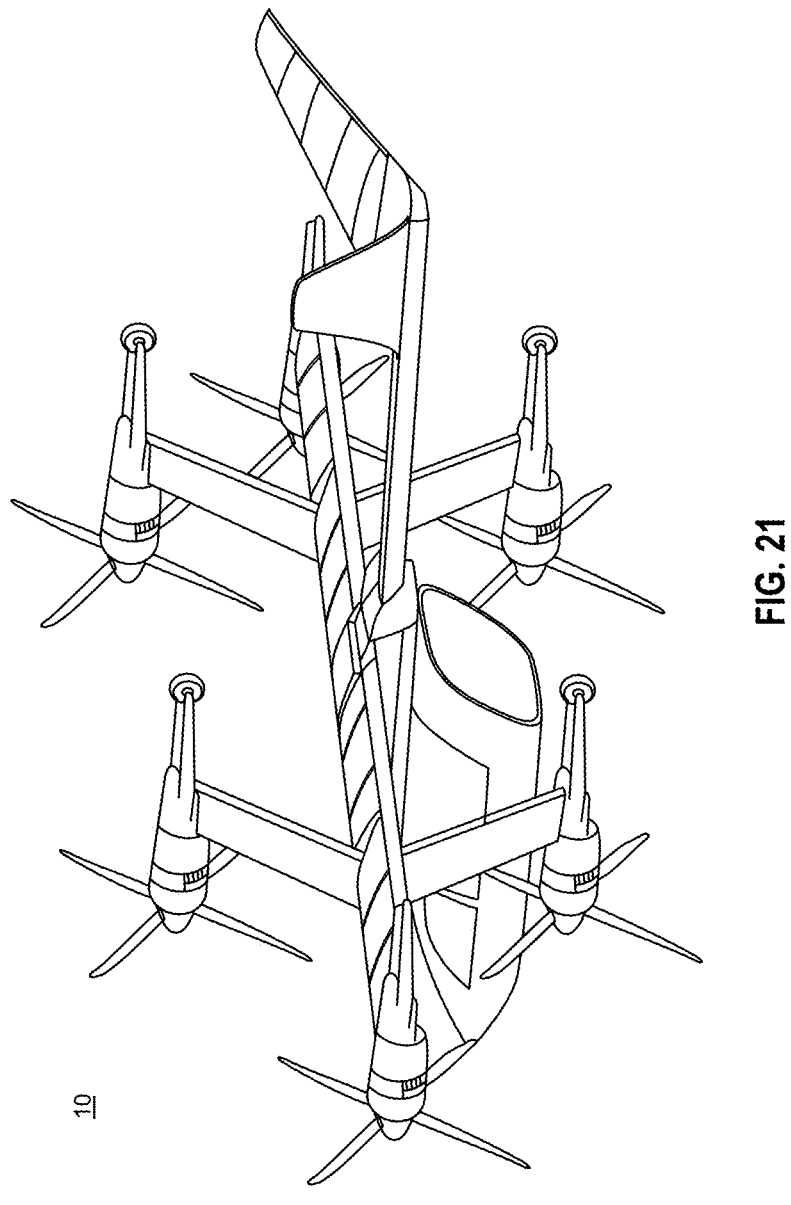

Modular Assembly Process:

The assembly process is primarily modular, with the starting point being the attachment of the tracks to one or more boom tubes followed by inserting one or more transverse members to set the distance between the boom tubes or to a tail module which is then attached to the boom tube. The below drawing shows the tail module separated from the single boom variant. The tail module is attached to the boom mechanically using fasteners which can include nuts, bolts and shear pins in the preferred embodiment. It may also be bonded in place. A single tube may also be utilized as shown in FIG. 19. The rear thruster assembly, if utilized, is then installed and the exit thrust vector control hardware is secured to the boom tubes. The landing gear module 33 is then secured to the boom tubes 25 followed by the wing assembly 14. The power modules 34, electric in another embodiment, including drive motor, propeller, thermal control system and energy source, are then secured to the wing and connected to the main bus bar. The rear control surfaces are then secured to the multiple booms using, in another embodiment, tracks similar to those used on the inner tube surfaces.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An aircraft including a plurality of structural elements, the structural elements comprising:
   a chassis module configured with one or more longitudinal elements, wherein the one or more longitudinal elements are configured to maintain longitudinal orientation during vertical and horizontal flight;
   one or more wings configured to attach to the chassis module;
   a programmable controller including instructions for operating an adjustment system;
   a pod module assembly being configured to be selectively attached to and detached from the chassis module and when attached to the chassis module said adjustment system executing recorded instructions for adjusting a center of gravity of the aircraft by moving said pod module along the one or more longitudinal elements of the chassis module;
   wherein the pod module assembly is configured to transport at least one of a passenger and cargo;
   wherein the pod module assembly is configured for operation as a vehicle when detached from the chassis module; and
   wherein the chassis module is comprised of one or more mechanical stops along the at least one longitudinal element of the one or more longitudinal elements to lock the pod module assembly in place.

2. The aircraft, as set forth in claim 1, wherein operation as a vehicle includes attaching the pod module vehicle to at least one of a ground vehicle, a watercraft, and an aerial vehicle.

3. The aircraft, as set forth in claim 1, further comprising a controller in operative communication with the adjustment mechanism;
   wherein the controller is configured to transmit a signal to the adjustment mechanism to vary the center of gravity of the aircraft.

4. The aircraft of claim 1, wherein the chassis module is configured with one or more tracks along the one or more longitudinal elements.

5. The aircraft of claim 1, wherein an energy module is translatable longitudinally along the chassis module to adjust the center of gravity of the aircraft.

6. The aircraft of claim 1, wherein the pod module assembly is comprised of a roll cage.

7. The aircraft of claim 1, wherein the pod module assembly is translatable longitudinally along the chassis module to adjust center of gravity of the aircraft.

8. The aircraft of claim 1, further comprised of a quick connect system, for connecting the pod module assembly to the chassis module.

9. The aircraft of claim 8, wherein the quick connect system is comprised of an electromagnetic connection.

10. The aircraft of claim 8, wherein the quick connect system is comprised of a mechanical connection.

11. The aircraft of claim 1, wherein at least one wing of the one or more wings attaches to the chassis module via a hinge assembly for transitioning between vertical and horizontal flight.

12. The aircraft of claim 1, wherein at least one wing of the one or more wings is rotatable.

13. The aircraft of claim 12, wherein at least one wing of the one or more wings rotates about a central transverse axis relative to the chassis module.

14. The aircraft of claim 1, wherein at least one wing of the one or more wings is configured to carry at least one battery module.

15. The aircraft of claim 14, wherein the at least one battery module is configured to move through a low friction interface within the at least one of the one or more wings.

\* \* \* \* \*